Aug. 7, 1945.  C. LEVY-SAVOYE  2,381,826
INDICATING DEVICE RESPONSIVE TO A CONDITION
Filed Sept. 18, 1942  3 Sheets-Sheet 1

Inventor
CHARLES LEVY-SAVOYE,
By Robert B. Pearson
Attorney

Aug. 7, 1945.   C. LEVY-SAVOYE   2,381,826
INDICATING DEVICE RESPONSIVE TO A CONDITION
Filed Sept. 18, 1942   3 Sheets-Sheet 2

DISPLACEMENT

PRESSURE

TEMPERATURE

Inventor
CHARLES LEVY-SAVOYE,
By Robert B. Larson
Attorney

Aug. 7, 1945.   C. LEVY-SAVOYE   2,381,826
INDICATING DEVICE RESPONSIVE TO A CONDITION
Filed Sept. 18, 1942   3 Sheets-Sheet 3

Inventor
CHARLES LEVY-SAVOYE,
By Robert B. Larson
Attorney

Patented Aug. 7, 1945

2,381,826

UNITED STATES PATENT OFFICE 2,381,826

INDICATING DEVICE RESPONSIVE TO A CONDITION

Charles Levy-Savoye, New York, N. Y., assignor to General Aircraft Equipment, Inc., a corporation of Connecticut Application September 18, 1942, Serial No. 458,912

2 Claims. (Cl. 73—407)

This invention relates to a system for obtaining indications.

One of the major problems in aviation today resides in providing the crew of an aircraft with means for checking the working conditions of the engine at any desired instance during its operation. In other words, it is necessary to provide the crew with correct data at all times concerning the oil pressure, oil temperature, water temperature, fuel pressure, number of revolutions, intake air pressure, intake air temperature and other factors of which the crew must be constantly aware. Heretofore this data has been obtained by various means, such as for instance, the oil pressure has been measured through the use of a tube passing from the engine to the cockpit and linked to a corresponding pressure gauge. Temperatures, for example, are transmitted in a similar manner by measuring the pressures of a given vapor.

The present invention as applied to an aircraft engine or the like permits various factors such as those indicated above to be taken at the engine while direct readings of the variations are available in the cockpit. The principal object of the invention is to provide a device which will accomplish this result.

The major object of the present invention resides in providing a device as merely electrical in nature for the purpose of checking, at a distance, the values of variable temperatures and pressures no matter what the external atmospheric conditions of temperature and pressure may be.

A still further object of the invention resides in providing an electrical indicating means positioned at a point remote from an aircraft engine. The invention has for a further object, the provision of a system which is simple and reliable in operation and easy to manufacture thus being admirably adapted for war production.

Other and further objects of the invention will become more apparent from the following description and claims when read in connection with the accompanying drawings in which:

Figure 1:
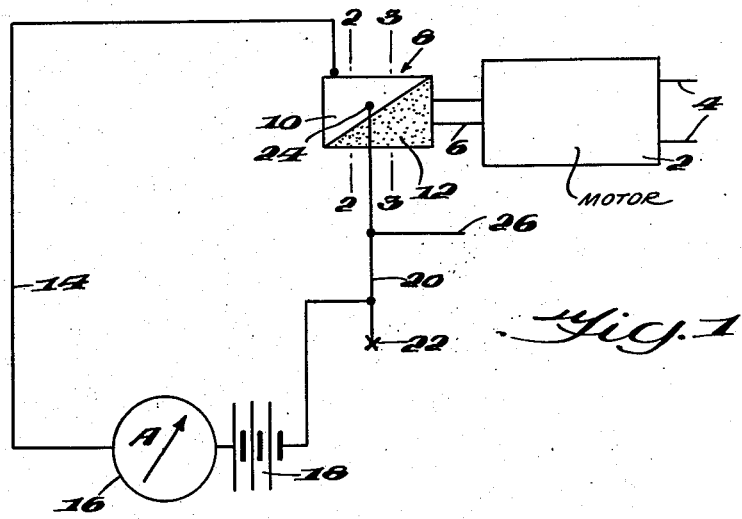
Figure 1 is a diagrammatic representation of the invention, including the electrical circuit employed therewith.

Referring now more specifically to Figure 1 of the drawings, the reference numeral 2 indicates an electrical motor which is energized through any suitable source of electromotive force 4, the motor 2 having an externally extending rotating shaft 6 on which a cylindrical member 8 is fixed to rotate therewith. The cylindrical member 8 is formed of two sections 10 and 12, respectively, section 10 consisting of a good electrical conductor, whereas, section 12 is comprised of an insulating material.

A series electrical circuit is employed comprising a conduit 14, one end of which is maintained in sliding continuous contact with the conducting section of cylinder 8 and the other end of which terminates on one of the binding posts (not shown) of the thermo-ammeter 16. The other terminal of the thermal ammeter is connected directly to an electromotive source comprising preferably a battery 18, the other terminal of the battery 18 being connected to a conductive rod 20, adapted to be pivoted about the point 22. The rod 20 is provided with a contacting element 24 which is adapted to be held in engagement with the exterior surface of the cylinder 8. A second rod 26 is connected to the rod 20 intermediate the pivoting point 22 and the element 24, the rod 26 being adapted to be moved laterally.

Figure 4:
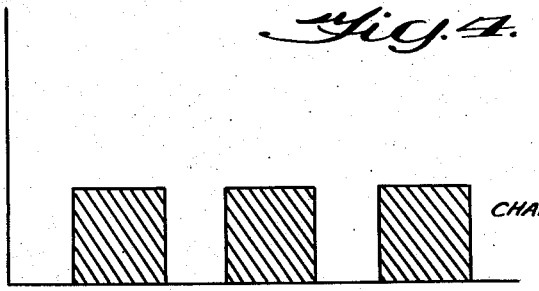
Figure 4 is a graphical representation indicating the length of current flow in the electrical circuit when a contacting element is positioned over line 2—2.
Figure 5:
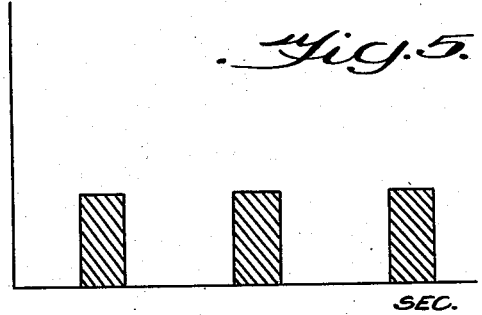
Figure 5 is a graphical representation similar to that of Figure 4, the contacting element having been shifted over the line 3—3.
Figure 6:
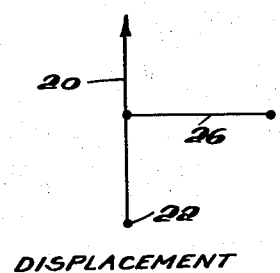
Figure 6 illustrates one means for shifting the contacting element over the various section lines.

Hence it will be seen that as the rod 26 is moved either to the right or left as viewed in Figure 1, the contacting element 24 will be shifted to such a degree that it will, if for instance moved to the left, remain in contact with the conducting surface of the cylinder for a length of time indicated generally in Figure 4 by the hatched portions. It will be understood that the current remains constant. On the other hand, if the contacting element 24 be moved to the right, the element will be maintained in contact with the insulating portion of the cylinder 8 for a much greater length of time than occurred in the first described position. This gives rise to the graph illustrated in Figure 5 in which the shaded portions indicate the time of contact with portion 10 of the cylinder. The rod 26 is adapted to be connected with a temperature or pressure responsive device or some other movable element representing an operating factor, and capable of producing a lateral displacement of the rod 26. As the rod 26 is displaced to the left of Figure 1, contact head 24 moves to the left of the constantly rotating cylinder 8 and consequently remains in contact with the conducting portion of the cylinder 8 for an increasingly longer period of time than it does on the insulating portion of the cylinder 8. During the course of the time that the contact element 24 remains in contact with the conductive material on the cylinder, the indicating arm of the ammeter will indicate a constant value of the current flowing through the series circuit so long as the contact head 24 remains in a fixed position with respect to the ends of the cylinder. The ammeter being located in the cockpit can thus be observed by the pilot who will correlate the length of time that the ammeter shows a deflection against a predetermined norm.

Figure 7:
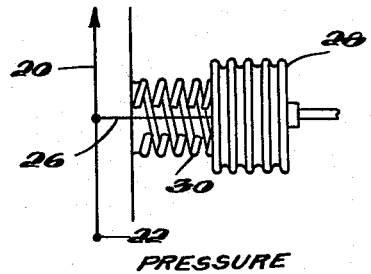
Figure 7 illustrates one modification of the invention adapted to indicate changes in pressure.

The manner in which this device operates having now been generally described, reference will now be made to specific means showing the adaptation of the device for changes in temperatures and pressure. In Figure 7 there is illustrated a Sylphon tube 28 which may be filled with any desired liquid. A spring means 30 is also provided against which the expansion of the Sylphon tube acts. Rigidly secured to one end of the Sylphon tube is the rod 26. A variation in the change of the pressure of the confined liquid will produce a movement of the Sylphon tube which is in turn directly communicated to the rod 26 which forces the rod 28 to rotate about its pivot 22. It becomes obvious from this type of arrangement that the length of time current passes through the ammeter 16 may be interpolated upon suitable scales to give a direct reading of any change in pressures.

Figure 8:
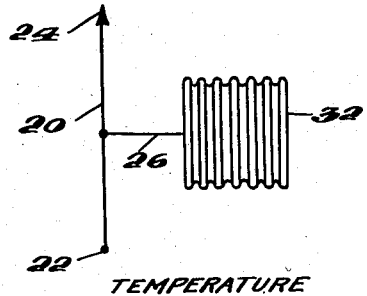
Figure 8 shows a further modification of the invention adapted to indicate variations in temperature.

Again, in Figure 8, there is illustrated one embodiment of the invention wherein variations of temperature may be indicated. This device is similar to the device employed in detecting variations of pressure in that again a Sylphon tube 32 is utilized, one end of which is directly connected to the rod 26, which transmits its lateral movement due to the expansion and contraction of the Sylphon tube to the rod 28. The contacting element 24 in moving across the external surface of the cylinder 8 produces a change in the length of time the current will flow through the series electrical circuit thereby affording means for determining the actual change in temperature. Here, as in the modification illustrated in Figure 7, the length of time which the current flows through the circuit must be interpolated upon a proper scale.

Figure 2:
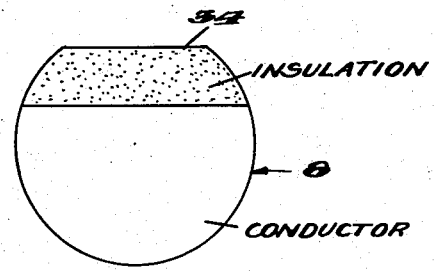
Figure 2 is a cross section taken on the lines 2—2 of Figure 1.
Figure 3:
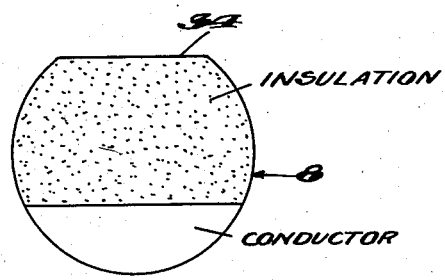
Figure 3 is a cross section taken on the line 3—3 of Figure 1.

In Figures 2 and 3, there is illustrated a cross section of the cylinder 8 taken along the lines 2—2 and 3—3, respectively. It will be seen that the insulating portion 12 has been provided with a flat portion 34. This portion has been cut away in order to reduce the friction of the contact head 24 against the portion 12 to an absolute minimum. In providing a flattened surface, such as 34, upon a cylinder 8, the contact head 24 will be retained in its position but in spaced relationship to the cylinder. This reduces wear not only on the contact head but also upon the external surface of the cylinder.

Figure 9:
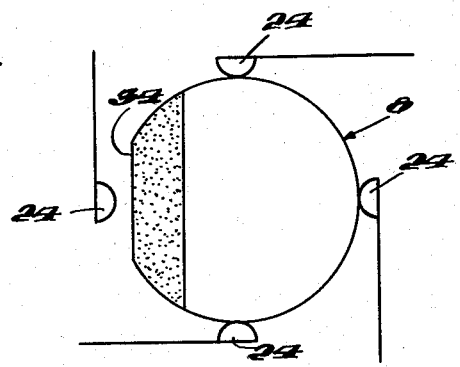
Figure 9 shows a modification of the cylindrical member shown in Figure 1.

In Figure 9 there is illustrated a further modification of this invention wherein a plurality of contact elements 24 are provided. Such a system permits one to take readings of temperatures and pressures, not only in one part of the aircraft engine, but in many parts thereof. As illustrated in Figure 9, this modification is suitably adapted to be employed upon a twin motor airplane wherein one desires to obtain readings as to the variations of temperatures and pressures in both engines. In this connection it may be found advisable to employ a series of circuits such as have been illustrated in Figure 1.

Figure 10:
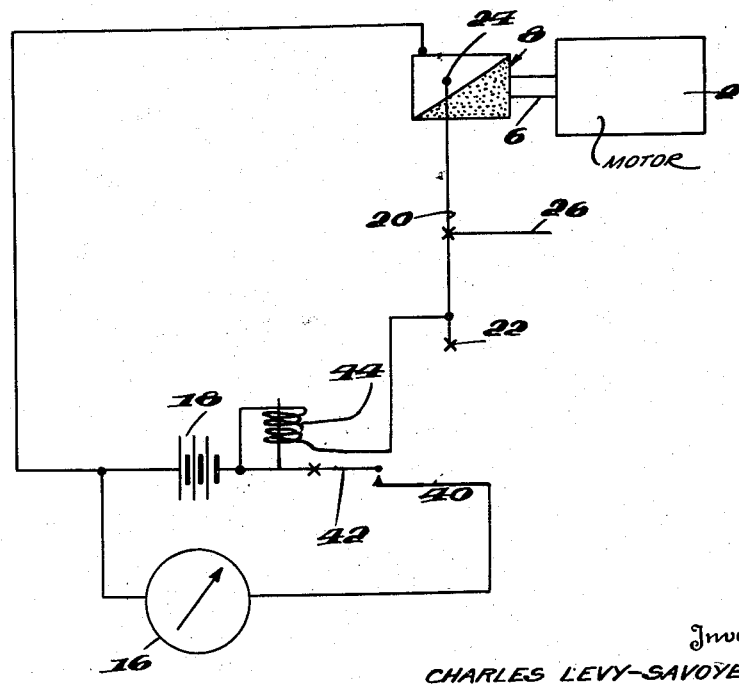
Figure 10 shows a relay system adapted to be controlled from the cockpit and is adapted to maintain a current of higher value through the electrical circuit.

It sometimes happens that the cylinder 8 becomes dirty and greasy and that contact member 24 does not make good electrical contact therewith. Such a condition might well affect and render inaccurate the readings on the ammeter. To overcome this difficulty, a circuit system as illustrated in Figure 10, may be employed. In this system, the line 40 is provided with a pivoted switch arm 42, adjacent to which is located the solenoid 44, so that, upon energization of the solenoid when the contact 24 rides on the conducting portion of cylinder 8, the switch arm 42 will be moved to closed position. Consequently, current of higher value flows into the ammeter and its reading is not affected by the condition of the conducting surface of the cylinder 8 or the effectiveness of the electrical contact between such surface and the contact point 24.

I claim:

1. An indicating device comprising a cylinder, means for rotating said cylinder at a constant rate of speed, said cylinder having its exterior surface provided with alternating strips of conductive and non-conductive material, each of said alternating strips being tapered in width, a pair of spaced electrical contacts adapted to bear against the exterior surface of said cylinder, at least one of said contacts being movable with respect to the longitudinal axis of said cylinder, an electric circuit the component parts of which are connected in series with said electrical contacts, said parts comprising an electrical battery and a solenoid, and a second electrical circuit adapted to be connected in parallel with said series circuit when said solenoid is energized, said second circuit including a thermal ammeter connected in series therewith and means responsive to variations in pressure, said means being coupled to said movable contact to impart movement thereto.

2. An indicating device comprising a member substantially cylindrical in configuration, said member adapted to be rotated at a constant speed, a motor for rotating said member, said member having alternate conductive and nonconductive exterior surface areas of varying widths, an electrical contact adapted to ride in a fixed position over the surface of said member, a second electrical contact adapted to bear on portions of said exterior surface of said member and being adjustable with respect to the ends of said member, an electrical circuit the component parts of which are connected in series with respect to said electrical contacts, said circuit comprising a thermal ammeter and a source of electro-motive force having a constant current value, means for adjusting the second contact on the surface of said member in such a manner as to permit said second contact to remain in contact with said conductive surface for a greater or lesser length of time, said cylindrical member having a portion cut away to provide a flattened surface on said non-conductive exterior surface of said member whereby said electrical contacts are retained out of engagement with said non-conductive material during a portion of the revolution of said cylindrical member.

CHARLES LEVY-SAVOYE.